United States Patent

[11] 3,633,888

[72] Inventors Douglas C. Kilian;
 Arthur P. Roeh, both of Idaho Falls, Idaho
[21] Appl. No. 12,643
[22] Filed Feb. 19, 1970
[45] Patented Jan. 11, 1972
[73] Assignee The United States of America as represented by the United States Atomic Energy Commission

[54] CONCENTRIC FLUIDIZED BEDS
3 Claims, 1 Drawing Fig.
[52] U.S. Cl. .................................................. 263/21 A, 34/57 A
[51] Int. Cl. .................................................. F27b 15/00
[50] Field of Search ........................................ 263/21, 21 A; 34/57, 57 A, 10

[56] References Cited
UNITED STATES PATENTS
3,236,607 2/1966 Porter, Jr. et al. .............. 34/57 A X
3,250,521 5/1966 Sergent .......................... 34/57 A X
FOREIGN PATENTS
150,425 11/1961 U.S.S.R. ......................... 34/57 A Primary Examiner—Charles J. Myhre
Attorney—Roland A. Anderson ABSTRACT: A fluidized bed burner has a center tube defining an inner fluidized bed, constituting a first-stage burner, and an outer tube concentric to the inner tube and spaced radially outward from the inner tube to define an annular-shaped fluidized bed. The upper portion of the center tube wall separating the fluidized beds is perforated to permit a free flow of material between the two beds for improved heat transfer and temperature control. The upper portion of the outer tube extends substantially above the top of the center tube to define a second-stage burner area above the fluidized beds.

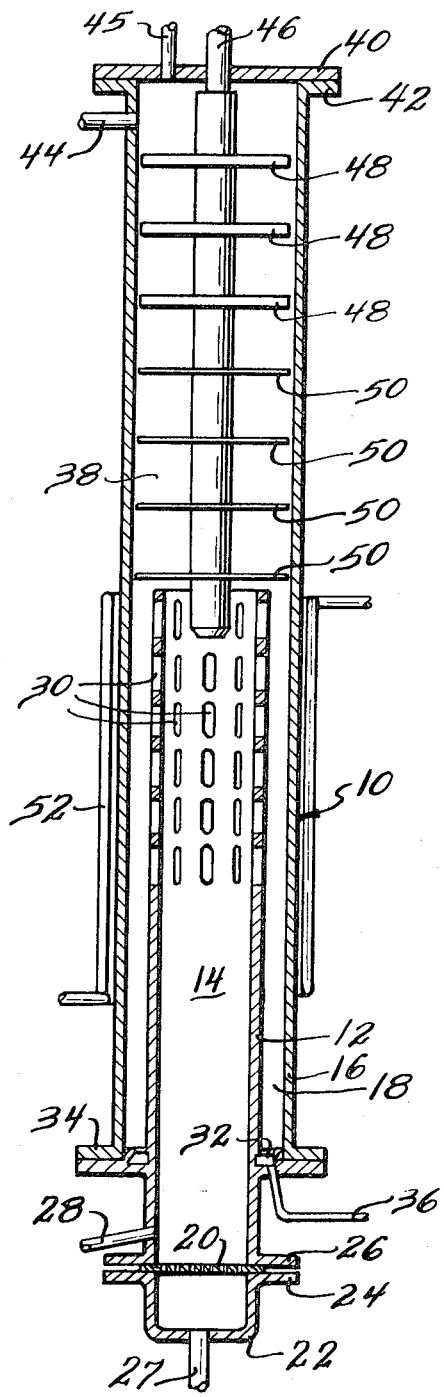

CONCENTRIC FLUIDIZED BEDS

CONTRACTUAL ORIGIN OF THE INVENTION

The invention described herein was made in the course of, or under, a contract with The UNITED STATES ATOMIC ENERGY COMMISSION.

BACKGROUND OF THE INVENTION

Processing of metallic clad nuclear fuels consists of dissolution of the cladding in common inorganic acids and subsequent uranium recovery by conventional liquid-liquid solvent extraction. Many nuclear fuels are now being developed in which the nuclear material, such as uranium carbide, is dispersed in a matrix of graphite. Since graphite is not readily dissolved by the common inorganic acids, a new method of processing is necessary to recover the nuclear material contained therein.

A relatively simple method employs combustion of the graphite matrix with oxygen and conversion of the uranium and other metallic components of the fuel to their solid oxides. The exposed $U_3O_8$ can then be dissolved in nitric acid to yield a solution from which the uranium can be separated from fission products by conventional solvent extraction.

Because the combustion of graphite is highly exothermic, the burner must be capable of dissipating heat at high rates. The fluidized bed with its excellent heat transfer characteristics is a logical medium in which to conduct the combustion reaction.

It was found, however, that in a conventional single-stage fluidized bed burner the oxygen was consumed in the lower portion of the bed so that there was insufficient oxygen to burn small graphite particles rising through the fluidized bed after release from the burning fuel surface. The addition of pure oxygen at various heights throughout the bed, which might solve the problem, would require very complex plumbing and was thus determined to be unfeasible.

SUMMARY OF THE INVENTION

The assembly of the present fluidized bed burner comprises a center tube which defines an inner fluidized bed where combustion is initiated and a plurality of outer tubes concentric to and spaced radially outward of the center tube to define annular fluidized beds between the tubes. The upper portion of the center tube wall is perforated to permit a flow of material between the beds. The upper portion of each successive tube outward from the center extends above the top of the next center tube to define a space above the fluidized beds where combustion is completed. A charging tube extends downward from the closed upper end of the outermost tube to the top of the center tube for charging the inner fluidized bed with combustible material.

In the apparatus just described, fuel elements consisting of uranium carbide microspheres dispersed in a graphite matrix may be charged into the assembly where the graphite is burned in the fluidized beds and the uranium carbide is oxidized to $U_3O_8$ which is elutriated from the beds in the off-gas from which the uranium oxide may be separated for further processing.

BRIEF DESCRIPTION OF THE DRAWING

The single FIG. is a longitudinal sectional view of the fluidized bed assembly of the present invention.

DESCRIPTION OF THE PREFERRED EMBODIMENT

As shown in the FIGURE, a two-stage fluidized bed comprises an assembly 10 consisting of center tube 12 which defines axial space 14 and outer tube 16, said tubes being vertical, concentric and spaced radially from one another to define annular space 18. Gas distribution plate 20 in the lower end of tube 12 is held in place and the lower end of tube 12 is closed by end cap 22 having flange 24 fastened to flange 26. Fluidizing gas inlet 27 penetrates end cap 22. Inner bed drain 28 penetrates the wall of tube 12 just above flange 26, while the upper portion of tube wall 12 is perforated about its circumference by a plurality of vertical slots 30. The lower end of tube 16 located above the lower end of tube 12 is sealed to tube 12 by annular gas distribution plate 32 attached to tube 16 by flange 34. Gas distribution plate 32 contains fluidizing gas inlet nozzle 36. The top of tube 16 extends a substantial distance above the top of tube 12 to define space 38, the upper portion of which is closed by end plate 40 attached to flange 42 about the top of tube 16. Off-gas outlet 44 penetrates the upper wall of tube 16 just below flange 42. Bed material charging port 45 penetrates plate 40 as does fuel charging tube 46 which extends downward from plate 40 along the longitudinal axis of tube 16 through the center of space 38 until its lower end is just below the top of tube 12. Spaced vertically along the upper portion of tube 46 and perpendicular to the axis thereof are a plurality of deflection baffles 48 consisting of a circular rim, which encloses a plurality of parallel rectangular plates set at an angle to the longitudinal axis. Spaced vertically along the lower portion of tube 46 and perpendicular to the axis thereof are a plurality of perforated disks 50. Heating element 52 encircles tube 16 from a position relative to the top of tube 12 downward to about the lower end of tube 16. Cooling means may encircle heating element 52 and tube 16 to control the temperature of the assembly, if necessary.

In operation, a fluidized bed is established in axial space 14 and annular space 18 by passing fluidizing gas upward through fluidizing gas distribution plates 20 and 32, respectively. The fluidized beds may be composed of many materials; however, alumina is preferred because of its resistance to attrition and its inertness. When the beds have been heated to the appropriate temperature by heating element 52, graphite containing uranium is fed into the fluidized bed in space 14 through fuel charging tube 46. The fluidized bed in space 14 constitutes the first-stage burner. As the graphite burns, pieces may move through slots 30 into the fluidized bed in annular space 18. Slots 30 allow mixing of both gas and particles between the fluidized beds and reduce slugging in the inner bed as a result of solids flow through the slots into the inner bed filling any large gas slug tending to form. Slotted tube 12 also permits higher heat transfer rates from the inner bed to the annular bed, permitting greater heat control of the inner bed.

As the graphite is burned in the inner first-stage bed, it moves upward into space 38 which is the second-stage burner and where graphite combustion is completed. Perforated disks 50 and deflection baffles 48 attached to charging tube 46 prevent expulsion of bed material and larger graphite particles through off-gas outlet 44 and in addition reduce any tendency toward slugging which may develop.

As the graphite is burned, the reaction gases formed leave the burner assembly through off-gas outlet 44. These gases may be used to carry the uranium oxide particles freed from the graphite material from the burner where they may be separated from the off-gases and processed further.

The following example is given as illustrative of the use of the apparatus of this invention and is not to be taken as limiting the scope or extent of the invention.

EXAMPLE

The two-stage burner assembly of the present invention was constructed in which the center first-stage tube was 4 inches × 4½ feet long, having the upper 2 feet perforated. The outer tube was 6 inches in diameter and extended 5½ feet above the top of the center tube. Fluidized beds of alumina were established by passing 100 percent oxygen at 1.5 ft./sec. upward through the center tube and at 2.00 ft./sec. upward through the annular space, which resulted in a fluidizing velocity of 1.75 ft./sec. in the second-stage burner area above the center tube. After the beds were heated to a temperature sufficient to initiate combustion, graphite was charged to the center bed at a rate of 2,450 g./hr. A summary of the results is given in the table below.

| | |
|---|---:|
| Overall oxygen utilization[a], % | 35 |
| Graphite Combustion Efficiency | 88[b] |
| Throughput rate, kg. graphite/day/ft.$^2$ (first-stage cross-sectional area) | 665 |
| First-stage heat[b] generation rate, B.t.u./hour | 47,600 |
| Average instantaneous temperature differential | |
| Within First Stage, °C. | 30 |
| Within Second Stage, °C. | 10 |

[a] Percent of oxygen reacted, based on graphite material balance.

[b] Based on 65 percent of the charged graphite burning to $CO_2$ in the first stage of the burner.

[c] Vapor space burning was observed.

It can be seen from the table that good results can be achieved with the apparatus of the present invention. Greater combustion efficiency should be attainable by increasing the height of the second stage. It should be noted that the temperature differential was very small when compared with temperature differentials obtained with other burners, where the temperature spread was normally 100°–150° F. with a maximum spread of 300° F. being noted.

It may be noted that the fluidized bed of this invention has uses other than that which has been described. For example, different gases may be used in each of the beds for fluidization. In addition, the use of perforated walls provides containment for particles of a desired size range but will allow interchange of gas and bed material between adjacent beds.

It is understood that the invention is not to be limited to the details given herein but that it may be modified within the scope of the appended claims.

The embodiments of the invention in which an exclusive property or privilege is claimed are defined as follows:

1. An apparatus for contacting a solid with a gas in a fluidized bed comprising:
   a. a plurality of vertically disposed concentric tubes with each successive tube outwardly from the center tube rising above the next inner tube, the outermost tube having a closed upper end, the center tube having a plurality of perforations about its circumference near its upper end, the outer tubes being spaced from each other and the center tube to define annular spaces therebetween;
   b. fluidizing means at the lower end of the center tube and at the lower end of each of said annular spaces for passing the fluidizing gas upward through said spaces, whereby fluidized beds can be established in said spaces;
   c. a charging tube having a relatively small diameter extending downward from the top of the outer tube along the longitudinal axis thereof to the top of the inner tube; and
   d. off-gas means in the closed upper end of said outer tube for permitting the outflow of fluidizing gas and elutriated solids from the fluidized beds.

2. The apparatus of claim 1 wherein heating means encircles the outermost tube for heating the fluidized beds.

3. The apparatus of claim 2 wherein the charging tube further comprises:
   a. a plurality of circular-shaped deflection baffles attached around the upper portion of said charging tube and perpendicular to the axis thereof; and
   b. a plurality of perforated disks attached around the lower portion of said charging tube and perpendicular to the axis thereof whereby said baffles and said disks prevent the expulsion of material from said fluidized beds.

* * * * *